(12) United States Patent
Namii

(10) Patent No.: US 7,283,298 B2
(45) Date of Patent: Oct. 16, 2007

(54) STEREOSCOPIC MICROSCOPE

(75) Inventor: Yasushi Namii, Hachioji (JP)

(73) Assignee: Olympus Corporation, Tokyo (JP)

( * ) Notice: Subject to any disclaimer, the term of this patent is extended or adjusted under 35 U.S.C. 154(b) by 224 days.

(21) Appl. No.: 11/263,922

(22) Filed: Nov. 2, 2005

(65) Prior Publication Data
US 2006/0072192 A1 Apr. 6, 2006

Related U.S. Application Data

(63) Continuation-in-part of application No. 10/663,821, filed on Sep. 17, 2003, now abandoned.

(30) Foreign Application Priority Data
Sep. 20, 2002 (JP) .............................. 2002-275280

(51) Int. Cl.
*G02B 21/06* (2006.01)
(52) U.S. Cl. .................... 359/388; 359/377; 359/380
(58) Field of Classification Search ...................... None
See application file for complete search history.

(56) References Cited

U.S. PATENT DOCUMENTS

| | | | |
|---|---|---|---|
| 3,790,249 A * | 2/1974 | Treace ........................ 359/388 |
| 4,353,618 A * | 10/1982 | Hagner et al. ............... 359/385 |
| 4,657,357 A | 4/1987 | Nishimura et al. |
| 5,446,582 A | 8/1995 | Takagi et al. |
| 5,748,367 A * | 5/1998 | Lucke et al. ................. 359/385 |
| 5,838,491 A | 11/1998 | Gartner et al. |
| 5,867,311 A | 2/1999 | Nakamura |
| 5,971,577 A * | 10/1999 | Mori et al. .................. 362/575 |
| 2001/0010592 A1 | 8/2001 | Nakamura |
| 2003/0201378 A1* | 10/2003 | Ishikawa et al. ......... 250/201.3 |

FOREIGN PATENT DOCUMENTS

| JP | H8-005923 | 1/1996 |
|---|---|---|
| JP | H8-257037 | 10/1996 |
| JP | 09274141 A * | 10/1997 |

* cited by examiner

*Primary Examiner*—Arnel Lavarias
(74) *Attorney, Agent, or Firm*—Arnold International; Jon W. Henry; Bruce Y. Arnold

(57) ABSTRACT

A stereoscopic microscope including a light source section, an illumination optical system, and an observation optical system. The illumination optical system has an optical axis and includes a projection optical system. The projection optical system forms an intermediate image and irradiates a light flux from the light source section onto an observation object. The observation optical system includes an objective lens, a pair of left and right zooming optical systems for changing the magnification of the observation optical system, and a pair of left and right eyepiece optical systems. A center position of the light source section is de-centered from the optical axis of the illumination optical system. Also, the illumination optical system includes a reflecting member which has two rounded notches and is inserted into and removed from a space on the object side of the objective optical system in conjunction with a zooming operation.

19 Claims, 10 Drawing Sheets

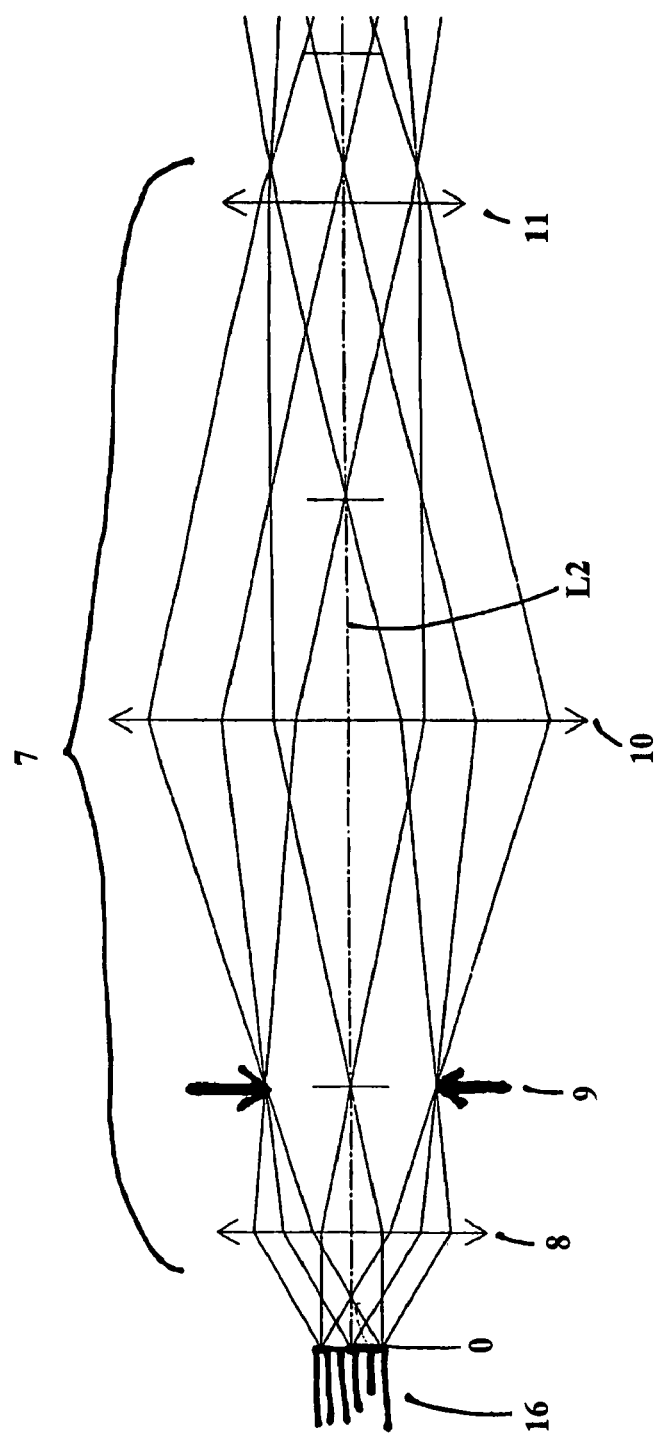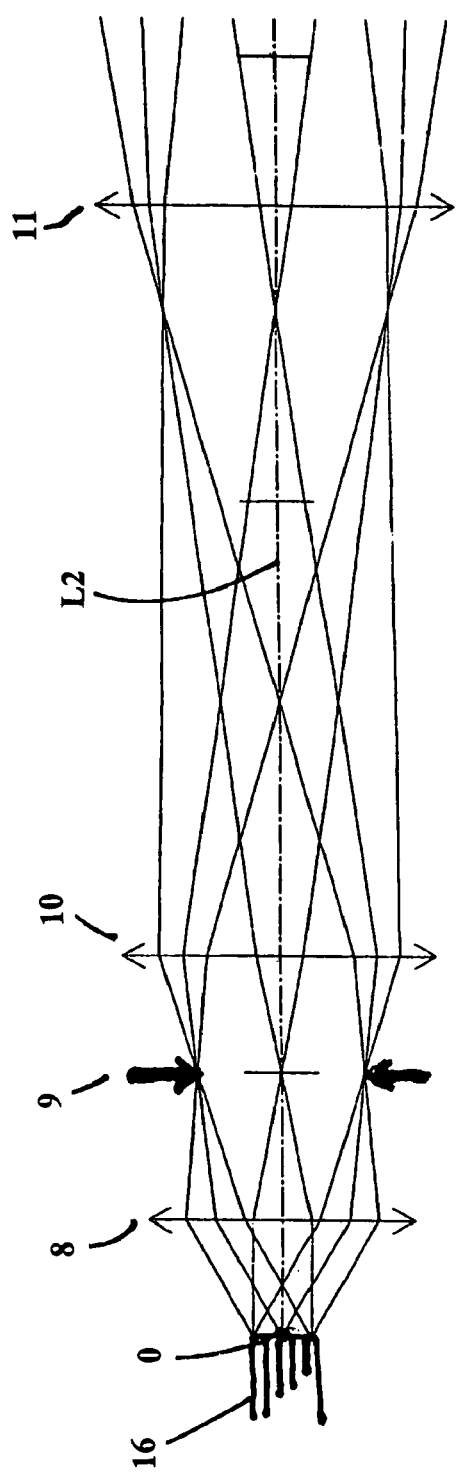
Fig. 10(a)
Fig. 10(b)

STEREOSCOPIC MICROSCOPE

This is a continuation-in-part application of U.S. application Ser. No. 10/663,821 filed Sep. 17, 2003 now abandoned, and claims the benefit of priority of JP 2002-275280 filed Sep. 20, 2002, the subject matter of which is hereby incorporated by reference.

BACKGROUND OF THE INVENTION

In recent years, many operations using a surgical microscope have been performed in order to make microscopic treatment possible in conjunction with the demand to minimize invasive surgery. Generally, surgical microscopes have an optical system built-in that provides a function for changing the observation magnification. For this reason, various treatments, such as suturing and so forth, can be performed under observation with the most appropriate magnification. For example, the most appropriate magnification may vary among a neurosurgical operation, the extraction of a tumor, the preventive treatment concerning a blood vessel which is developing abnormally, and so forth.

Further, a surgical procedure may not be performed on a flat surface, as it has been common for many years for surgery to be within a cavity. In a cavity, the light used to illuminate the surgical area is easily shielded by the entrance perimeter to the cavity when a surgical procedure is performed, especially when the cavity is deep. Accordingly, it is preferable that the optical axis of an illuminating beam be as closely aligned as possible to the optical axis of an observation beam for observing a surgical area in order for the illuminating beam to reach sufficiently deep into the cavity without being shielded.

As a result, various surgical microscopes have been set forth in the prior art that arrange the optical axis of an illuminating beam (hereinafter referred to as the illumination optical axis) so as to be nearly aligned with the optical axis of the observation beam (hereinafter referred to as the observation optical axis), or which arrange it to be matched with the direction of the observation optical axis.

As shown in FIG. 1 of Japanese Laid-Open Patent Application H8-257037, a conventional surgical microscope irradiates an illuminating beam onto a surgical area from a direction that is matched with the direction of the observation optical axis by arranging a beam splitter/combiner on the optical axis directly below the observation optical system. An illumination light flux is received from a direction that is normal to the direction of the observation optical system, and the beam splitter/combiner reflects the illuminating light beam so as to be co-linear with the optical axis of the observation optical system.

Other conventional surgical microscopes are made to irradiate an illuminating beam from two fixed directions to an observation object in the case where a surgical area is within a deep hole, as shown in FIG. 2 of Japanese Patent No. 3011950 and in FIG. 1 of Japanese Laid-Open Patent Application H10-73769. The illumination beam is divided into two illuminating beams in order to irradiate light into the deep hole, with the two illuminating beams being positioned symmetrically about the observation optical axis.

In addition, there are conventional surgical microscopes, as disclosed in FIG. 7 of Japanese Patent Publication H6-44101 and in FIG. 3 of Japanese Patent No. 2891923, which are made to illuminate a surgical area through an opening between left eye and right eye observation light fluxes, and an illumination optical system is constructed so as to direct the illuminating light to the surgical area from the opening.

In the surgical microscope disclosed in Japanese Laid-Open Patent Application H8-257037, less than one-fourth of the illumination of the beams emitted from the light source enter into the observation optical system, since only half of the illumination beam is reflected by the beam splitter/combiner toward the observation object and, of the illumination light that strikes the observation object and is reflected, only half is transmitted by the beam splitter/combiner and enters the observation optical system. Therefore, a surgeon must perform an operation while viewing either a dark image of the observation object or he must resort to using an expensive, high intensity light source which is capable of emitting a sufficient intensity of light to provide a bright image.

In the surgical microscopes disclosed in Japanese Patent No. 2891923 and in Japanese Laid Open Patent Application H6-44101, the left and right observation light fluxes, which correspond to the left and right observation optical systems, are on opposite sides of the illuminating light flux. Thus, even though the illuminating light flux reaches the bottom of a deep hole as a result of being aligned with the axis of the hole, the observation light fluxes become shielded by the entrance perimeter into the hole as the distance between the left and right light fluxes is large. Thus, the bottom of the hole will not be visible to an observer.

In the surgical microscopes disclosed in Japanese Patent No. 3011950 and Japanese Laid-Open Patent Application H10-73769, an inner wall of a deep hole can be illuminated brightly compared to the case of irradiating light from a single direction. However, observing bright images of a surgical area at the bottom of a deep hole has not yet been achieved because, in these conventional microscopes as well as other conventional microscopes, the angle between the illuminating light beams and the observation optical axis has not changed. Thus, there is a need to reduce the angle between the illuminating light beams and the observation optical axis in optical systems that efficiently use the available light so that bright images of a surgical area at the bottom of a deep hole can be observed.

BRIEF SUMMARY OF THE INVENTION

The present invention relates to a stereoscopic microscope, and more specifically, to a surgical stereoscopic microscope. The purpose of the present invention is to provide a surgical stereoscopic microscope that has the ability to provide bright images of surgical areas at the bottom of a deep hole without requiring high intensity light sources, which are disadvantageous in the amount of heat and evaporation produced.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 10(a) and 10(b) illustrate light rays of the illumination optical system in states where the light source is not de-centered, with FIG. 10(a) showing the light rays at the time of low magnification observation (i.e., wide-range illumination) and FIG. 10(b) showing the light rays at the time of high magnification observation (i.e., narrow-range illumination).

DETAILED DESCRIPTION

A stereoscopic microscope according to the present invention is formed of a light source section, an illumination optical system, and an observation optical system. The light source section includes a light guide having an output end. The illumination optical system forms an intermediate image of the output end of the light guide and includes a reflecting prism and a projection optical system that projects the light from the light guide end onto an observation object. The observation optical system includes an objective optical system, left and right zooming optical systems for changing the magnification of the observation optical system, and left and right eyepiece optical systems.

According to a first feature of the invention, a center position of the light source section is de-centered with respect to an optical axis of the illumination optical system so that illumination light flux from the illumination optical system becomes more nearly aligned with an optical axis of the observation optical system. Thus, a distance between the illumination light flux and the optical axis of the observation optical system is smaller when the light source section is de-centered from the optical axis of the illumination optical system than when the light source section is aligned on the optical axis of the illumination optical system.

According to a second feature of the invention, a reflecting prism of the illumination optical system is inserted into and removed from a space on the object side of the objective optical system in conjunction with a zooming operation of the left and right zooming optical systems.

Other features of the invention will be discussed in conjunction with several embodiments of the invention which will now be described in detail with reference to the drawings.

Embodiment 1

Figure 1A:
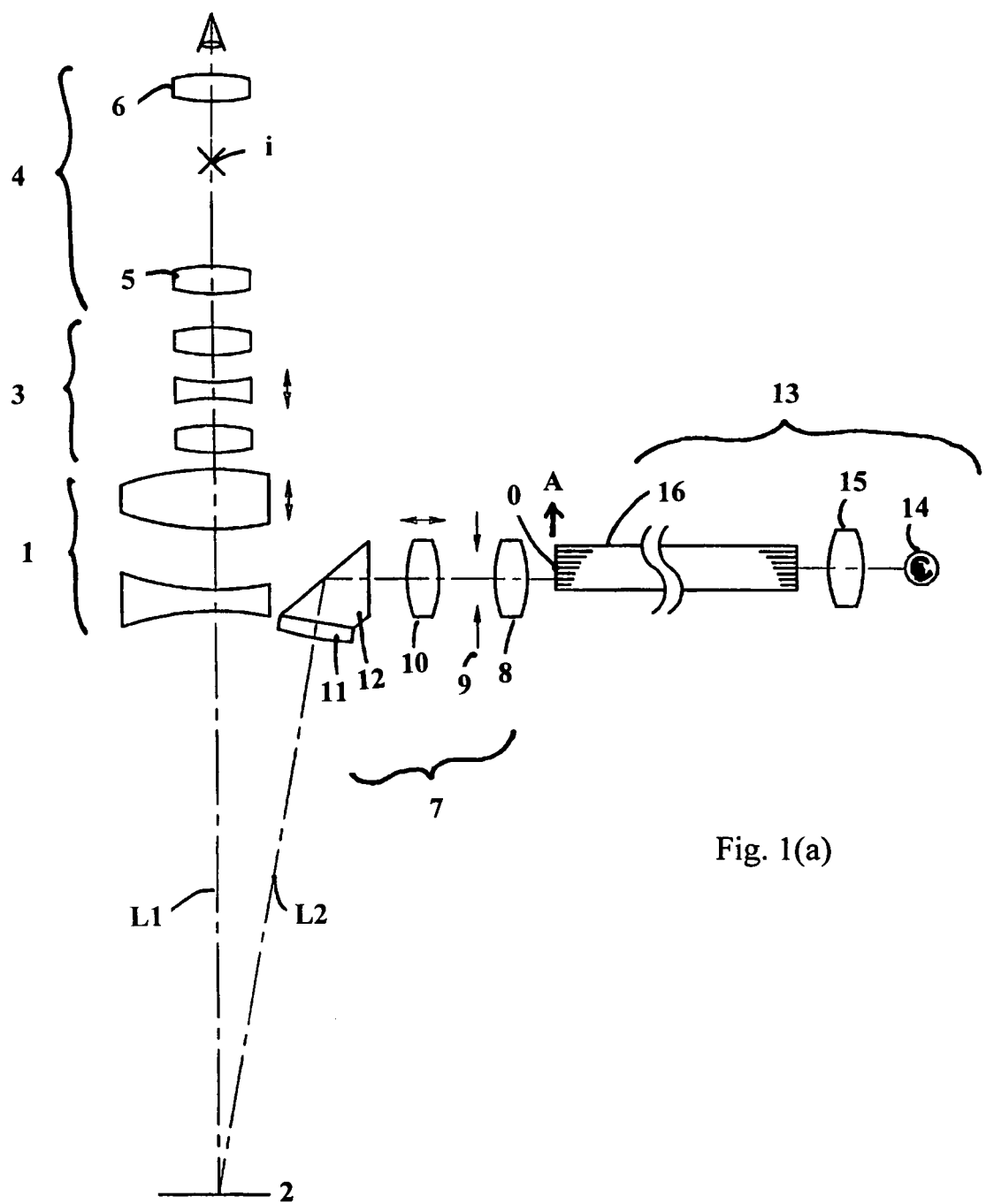
FIGS. 1(a) and 1(b) are a side view and a partial illustration from below, respectively, of a surgical microscope constructed according to Embodiment 1.
Figure 1B:
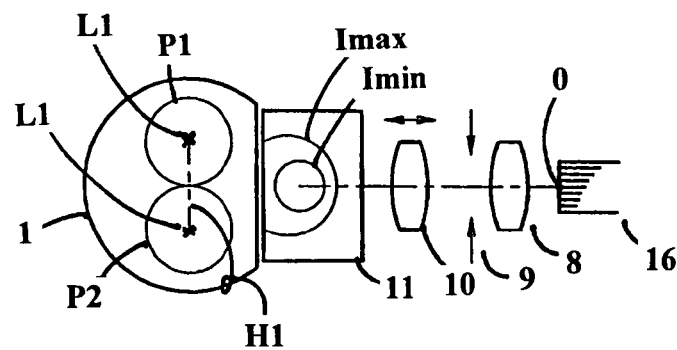

The construction of the surgical microscope according to Embodiment 1 is shown in FIGS. 1(a) and 1(b), with FIG. 1(a) being a side view and FIG. 1(b) being a partial illustration from below. The observation optical system of the surgical microscope should provide a parallax corresponding to the left and right eyes of the observer, and left and right observation optical systems to the rear of the objective optical system are provided. However, only one observation optical system is visible in FIG. 1(a), as the other observation optical system is obscured by the illustrated components.

Referring to FIG. 1(a), an objective optical system 1 of the observation optical system gathers the light flux incident thereon and outputs a substantially collimated light flux to a zooming optical system 3. When viewing a surgical microscope such as that shown in FIG. 1(a) from the side, the observation optical axis L1 of the zooming optical system 3 that is visible and the optical axis of the objective optical system 1 appear as a single line. The zooming optical system 3 of the observation optical system performs afocal zooming on the light flux incident thereon and outputs a substantially collimated light flux to the eyepiece optical system 4. The eyepiece optical system 4 is formed of an image formation lens 5 and an eyepiece lens 6. The image formation lens 5 is arranged on the optical axis L1 above the zooming optical system 3, and the substantially collimated light flux that is output from the zooming optical system 3 is incident onto the image formation lens 5. After passing through the image formation lens 5, the light forms an image at the position i after first passing through an image rotator (not shown). An eyepiece lens 6 enlarges the image that is formed at the image formation position i so as to be observed by a surgeon.

The illumination optical system 7 that illuminates a surgical area 2 is arranged orthogonal to the optical axis of the objective optical system, as shown in FIG. 1(a). The illumination optical system 7 is formed of a condenser lens 8, an illumination field diaphragm 9, a variator lens 10 that can change the range of the illumination field when moved as indicated by the double-headed arrow, and an illumination lens 11 for adjusting the focus point of the image of the illumination field diaphragm that is obtained by the variator lens 10 onto the surgical area 2. The variator lens 10 works with the zooming action of the zooming optical system 3. The illumination lens 11 and the reflecting prism 12 are cemented together. The reflecting prism 12 is for reflecting the light flux from the variator lens 10 toward the surgical area 2.

Figure 5:
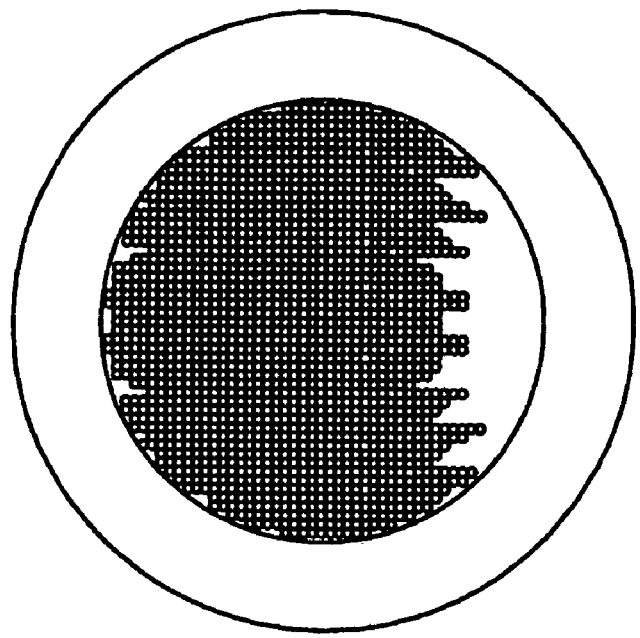
FIG. 5 illustrates the shape of an output end of a light guide according to Embodiment 1.
Figure 6:
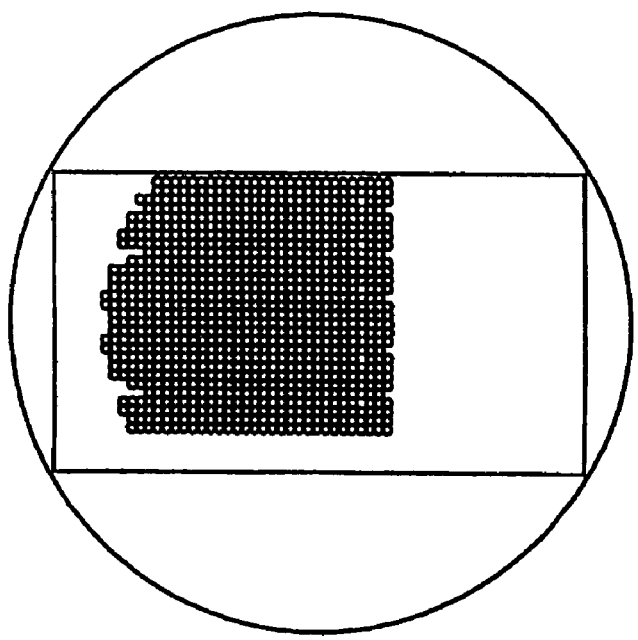
FIG. 6 illustrates the shape of an output end of a light guide according to Embodiment 2.

A light source member 13 is formed of a light source 14, a condensing lens 15, and a light guide 16. The center position O of the output end of the light guide 16 is de-centered in a direction that is transverse to the length direction of the light guide near its output end (i.e., the direction indicated by the arrow A in FIG. 1(a)). Further, the shape of the output end of the light guide 16 is circular, as illustrated in FIG. 5. In the figure, each of the small circles represents an optical fiber that constructs the light guide. The circular output ends are filled with optical fibers and only a part of the fibers are illustrated.

The light flux output by the light source 14 is collected by the condensing lens 15 and enters one end of the light guide 16. The light flux that is output from the other end of the light guide 16 passes through, in sequential order, the condenser lens 8, the illumination field diaphragm 9, the variator lens 10, the reflecting prism 12, and the illumination lens 11 to thereafter illuminate the surgical area 2. The illumination optical system 7 of the present embodiment is a Koehler illumination optical system that projects the exit pupil of the illumination optical system to the surgical area 2. As can be seen in FIG. 1(a), the condenser lens 8 and the variator lens 10 form a projection optical system that projects light that exits from the end of the light guide 16. Accordingly, an image of the output end of the light guide 16 is formed on the surface of the illumination lens 11 that is nearest the surgical area 2 by means of the condenser lens 8 and the variator lens 10 of the illumination optical system. Further, an image of the illumination field diaphragm 9 is formed onto the surgical area 2 by means of the variator lens 10 and the illumination lens 11.

Since the light guide output end image is zoomed by the variator lens 10, the size of the image changes according to the magnification. The state of the light guide output end image formed in the reflecting prism 12 is shown in FIG. 1(b). The label "Imax" of FIG. 1(b) is the image of the output end of the light guide 16 at the time of high magnification (i.e., when the illumination field is narrow). Also, the label "Imin" of FIG. 1(b) is the image of the output end of the light guide 16 at the time of low magnification (i.e., when the illumination field is wide).

FIGS. 10(a) and 10(b) illustrate light rays of the illumination optical system in states where the center O of the light source is not de-centered, with FIG. 10(a) showing the light rays at the time of low magnification observation (i.e., wide-range illumination) and FIG. 10(b) showing the light rays at the time of high magnification observation (i.e., narrow-range illumination).

Figures 11A, 11B:
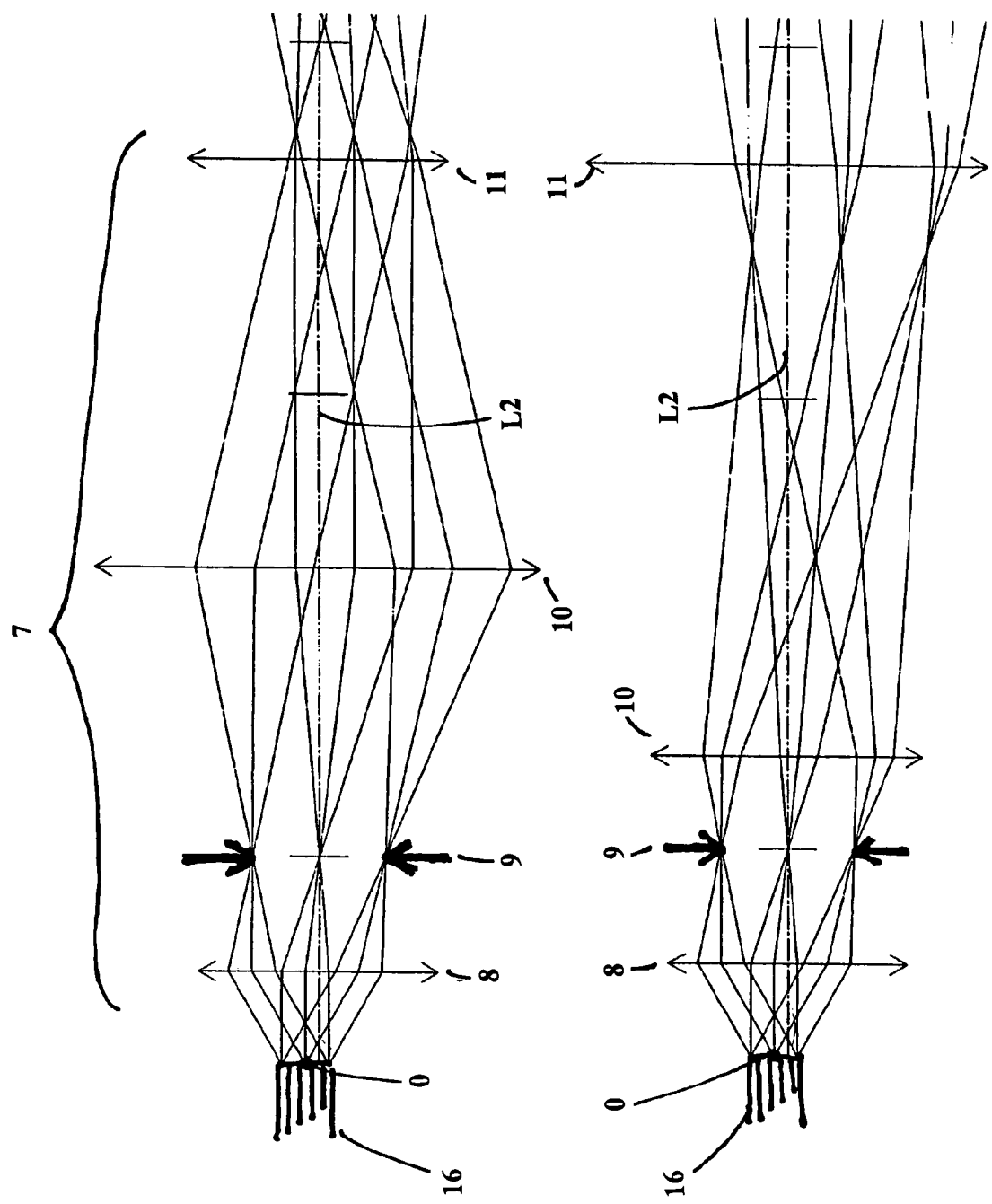
FIGS. 11(a) and 11(b) illustrate light rays of the illumination optical system in states where the light source is de-centered, with FIG. 11(a) showing the light rays at a time of low magnification observation (i.e., wide-range illumination) and FIG. 11(b) showing the light rays at a time of high magnification observation (i.e., narrow-range illumination).

FIGS. 11(a) and 11(b) illustrate light rays of the illumination optical system in states where the center O of the light source is de-centered, with FIG. 11(a) showing the light rays at the time of low magnification observation (i.e., wide-range illumination) and FIG. 11(b) showing the light rays at the time of high magnification observation (i.e., narrow-range illumination). The illuminated area on the object plane is an image of the illumination field diaphragm in the illumination optical system. In FIGS. 10(a)-11(b), the illumination field diaphragm 9 is projected onto the object plane that is positioned far above the top end of the paper in each figure. Comparing FIGS. 10(a) and 10(b), the cross section of the light flux is greater in FIG. 10(b) than in FIG. 10(a), but the diverging angle of the light rays is greater in FIG. 10(a) (wide-range illumination) than in FIG. 10(b) (narrow range illumination). Therefore, the image of the illumination field diaphragm 9 formed on the object plane (namely, the illumination area of the object field far from the lens 11) is greater in FIG. 10(a) than in FIG. 10(b). In FIG. 1(b), Imin shows the situation of FIG. 10(a), that is, the cross-section of the light flux is small for low magnification (wide illumination). On the other hand, Imax shows the situation of FIG. 10(b), that is, high magnification (narrow illumination). The same situation holds true when FIGS. 11(a) and 11(b) are compared. In FIGS. 10(a)-11(b), the reflecting prism 12 is not illustrated.

As is apparent from viewing FIGS. 10(a)-11(b), a change in size of the light flux in the vicinity of the illumination lens 11 (near the location of the image of the output end of the light guide 16) can be discerned for low versus high magnification. More specifically, the light flux in the vicinity of the illumination lens 11 in FIGS. 11(a) and 11(b) is more de-centered with respect to the illumination system optical axis (L2 in FIG. 1(a)) than it is in FIGS. 10(a) and 10(b).

Because the image of the output end of the light guide 16 is de-centered from the illumination optical system in a direction that causes the illuminating light flux on the observation object to be more nearly aligned with the optical axis L1 of the observation optical system, the amount of shielding of the illuminating light flux at the entrance to a deep hole is reduced, thereby allowing the bottom of the deep hole to be illuminated. Thus in the present invention, a surgeon is able to observe bright images of an object at the bottom of a deep hole through the eyepiece optical system 4.

In addition, peripheral portions of the objective optical system 1 are cut-out or omitted during the manufacturing process to the extent that the light fluxes P1 and P2 of the observation optical system are not eclipsed, as shown in FIG. 1(b). Because the illumination lens 11 and reflecting prism 12 are arranged at the position where a peripheral portion has been cut-out or omitted, the direction of the observation optical axis L1 and of the optical axis of the observation object illuminating flux (i.e., the light flux that has been reflected toward the observation object by the reflecting prism 12) can be nearly aligned.

Although the illumination optical system 7 is an optical system with a variable range illumination field, the above-mentioned structure is also applicable to the illumination optical system having a fixed range illumination field.

When the observation magnification is low and the observation field of view is wide, a surgeon usually does not view the image at the bottom of a deep hole. The wide-range illumination is mainly used for viewing shallow surgery over a broad area or for surgery prior to digging a deep hole. Because the available light from the illuminating source is spread over a wide area, there is no excess of illumination intensity at low magnification. For this reason, the illuminating optical system must not eclipse the fluxes within the observation optical system at low magnification. On the other hand, the narrow-range illumination is mainly used for viewing images at the bottom of a deep hole. When the observation field of view is narrow, a narrow-range illumination field enables an increased intensity of illumination. For this reason, the illuminating optical system may slightly eclipse the fluxes within the observation optical system without causing the observed image to become too dark, since there is excess brightness for observation at the time of high magnification. Thus, when the observation magnification is high, the surgeon can view bright images of an object at the bottom of a deep hole even though there is some eclipsing. Preferably, the observation magnification is within a range of 7 to 25.

In the present embodiment, the light source member 13 (more specifically, the output end of the light guide 16) is de-centered from the illumination optical system 7. Referring once again to FIG. 1(b), there is no eclipsing of the illumination Imin and no reduction of brightness at the time of low-magnification (when no excess intensity of illumination is available). On the other hand, at the time of narrow-range illumination (i.e., high magnification) there is eclipsing of the illumination Imax, but the surgeon is able to observe even the bottom of a deep hole because the illuminating light flux approaches the optical axis L1 of the observation optical system.

By merely de-centering the light source member 13 in this way, a surgical microscope that satisfies the demands of surgeons is provided. In addition, a better microscope can be achieved if the amount of de-centering of the output end of the light guide can be freely selected. A mirror can be used instead of the prism 12. The light guide 16 can be omitted. In that case, the light source 14 is placed in a position where the exit end of the light guide 16 was placed.

In the present embodiment, the reflecting prism 12 and the illumination lens 11 are cemented to one another. This prevents any possibility of slippage of the two components when moving the reflecting prism 12 and the illumination lens 11 depending on the zooming magnification, as will be described in a later embodiment. Accordingly, observation of the bottom of a deep hole is further enhanced.

Embodiment 2

Figure 2A:
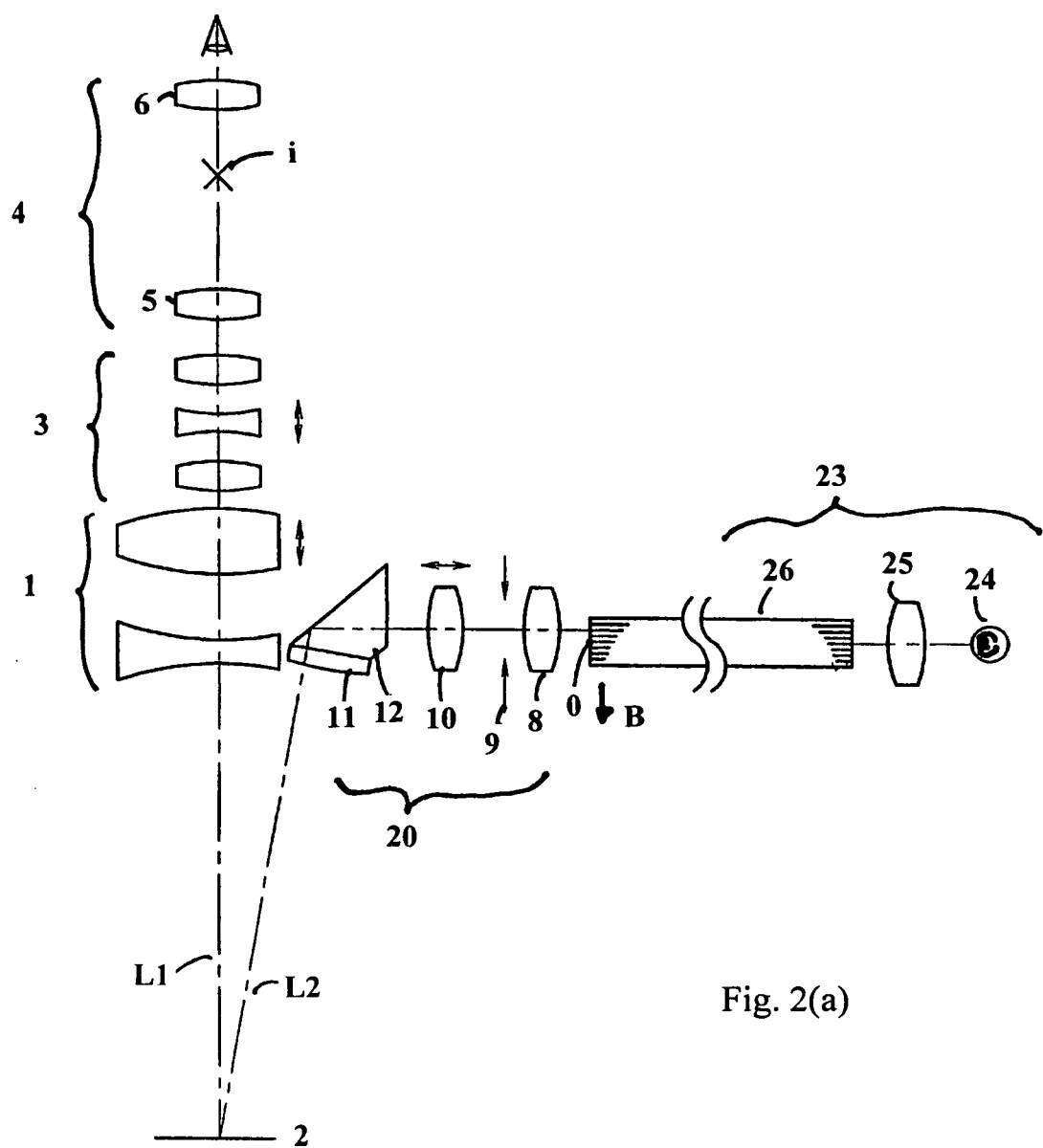
FIGS. 2(a) and 2(b) are a side view and a partial illustration from below, respectively, of a surgical microscope constructed according to Embodiment 2.
Figure 2B:
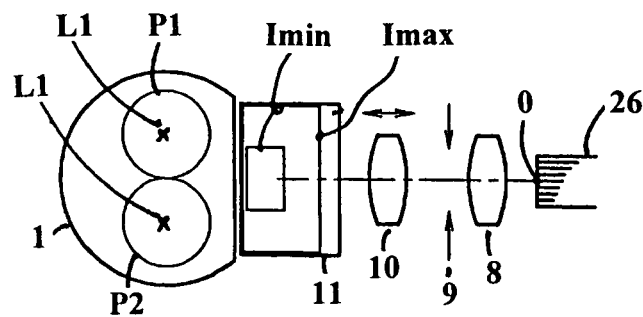

The construction of a surgical microscope according to Embodiment 2 is shown in FIGS. 2(a) and 2(b), with FIG. 2(a) being a side view and FIG. 2(b) being a partial illustration from below. The illumination optical system 20 of this embodiment is again of the Koehler-type and is formed of a condenser lens 8, an illumination field diaphragm 9, a variator lens 10, and an illumination lens 11. The variator lens 10 can be moved as indicated by the double-headed arrow to change the illumination range in conjunction with the zooming action of the zooming optical system 3. The illumination lens 11 is cemented to the reflecting prism 12 which reflects the light flux from the variator lens 10 toward the surgical area 2.

The light source member 23 is constructed from a light source 24, a condensing lens 25 and a light guide 26. In this embodiment, the center position O of the output end of the light guide 26 is de-centered from the optical axis of the illumination optical system 20 in the opposite direction than in Embodiment 1. In this instance, the output end of the light guide is de-centered toward the surgical area 2 (the direction indicated by the arrow B in FIG. 2(a)). It is preferred that the size of this output end is determined so that the output end image of the light guide that is projected at the time of high magnification by the condenser lens 8 and the variator lens 10 is almost as large as the entrance/exit surfaces of the reflecting prism 12 and the illumination lens 11. The remaining construction is the same as Embodiment 1 and therefore the description thereof will be omitted.

The light flux output from the light guide 26 undergoes image formation on the reflecting prism 12 and illumination lens 11 by means of the condenser lens 8 and the variator lens 10, and an image is formed as shown in FIG. 2(b). The output end image of the light guide 26 at the time of low magnification is indicated as Imin, and the output end image at the time of high magnification is indicated as Imax. For this reason, the same efficacy can be as achieved for Embodiment 1 at the time of high magnification, yet the illuminating light flux and the observation optical axis L1 can approach each other at the time of low magnification. Moreover, in Embodiment 1 the illumination optical system 7 at the time of high magnification shaded the illuminating light flux, resulting in a loss of light, but in the present embodiment it is possible to efficiently illuminate the surgical portion 2 since the output end shape of the light guide is a rectangle equivalent to the transmission surface of the illumination lens 11 and the reflecting prism 12, thereby enabling a surgeon to adequately observe an object in a deep hole.

Embodiment 3

Figure 3A:
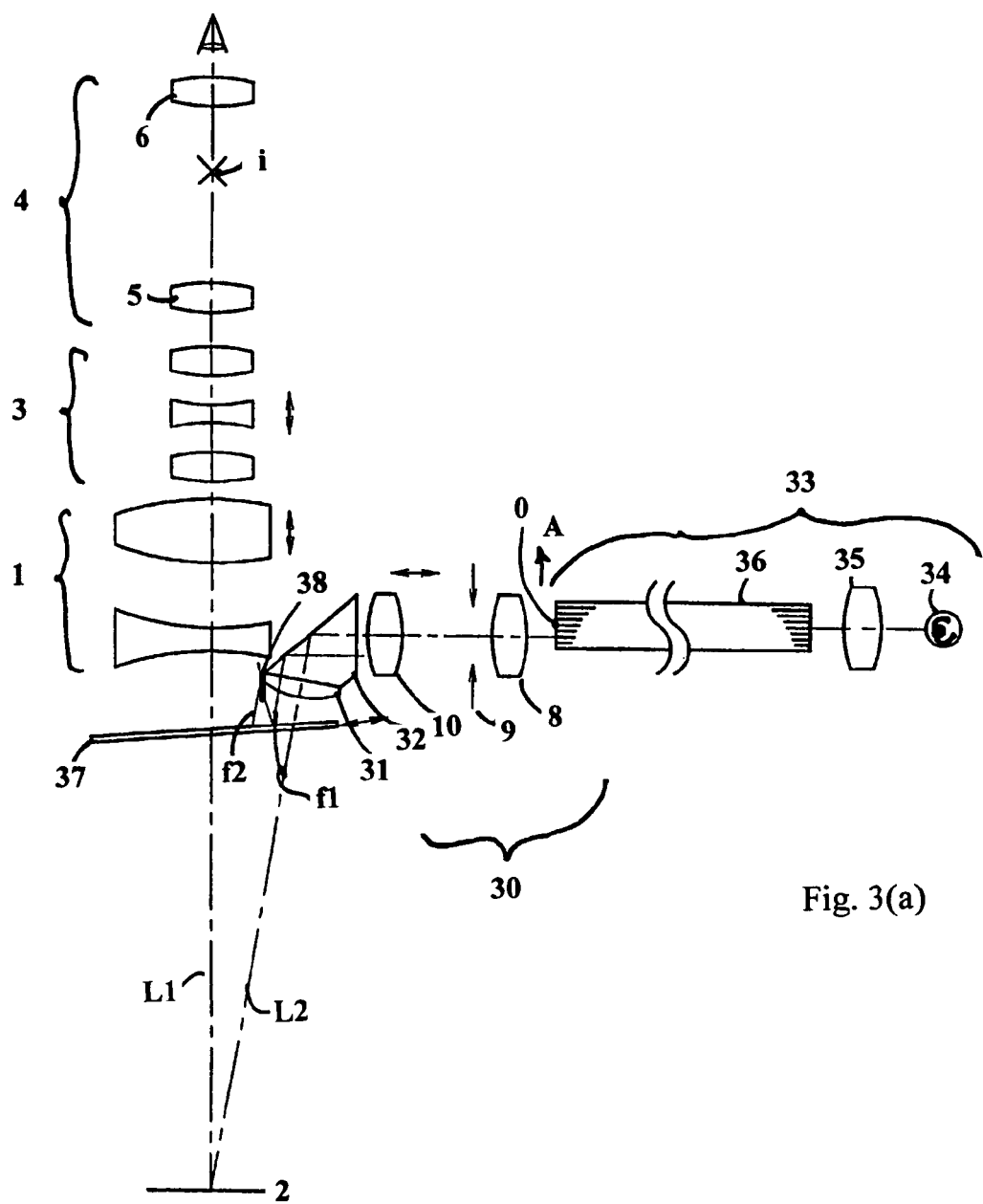
FIGS. 3(a) and 3(b) are a side view and a partial illustration from below, respectively, of a surgical microscope constructed according to Embodiment 3 at the time of low-magnification observation.
Figure 4A:
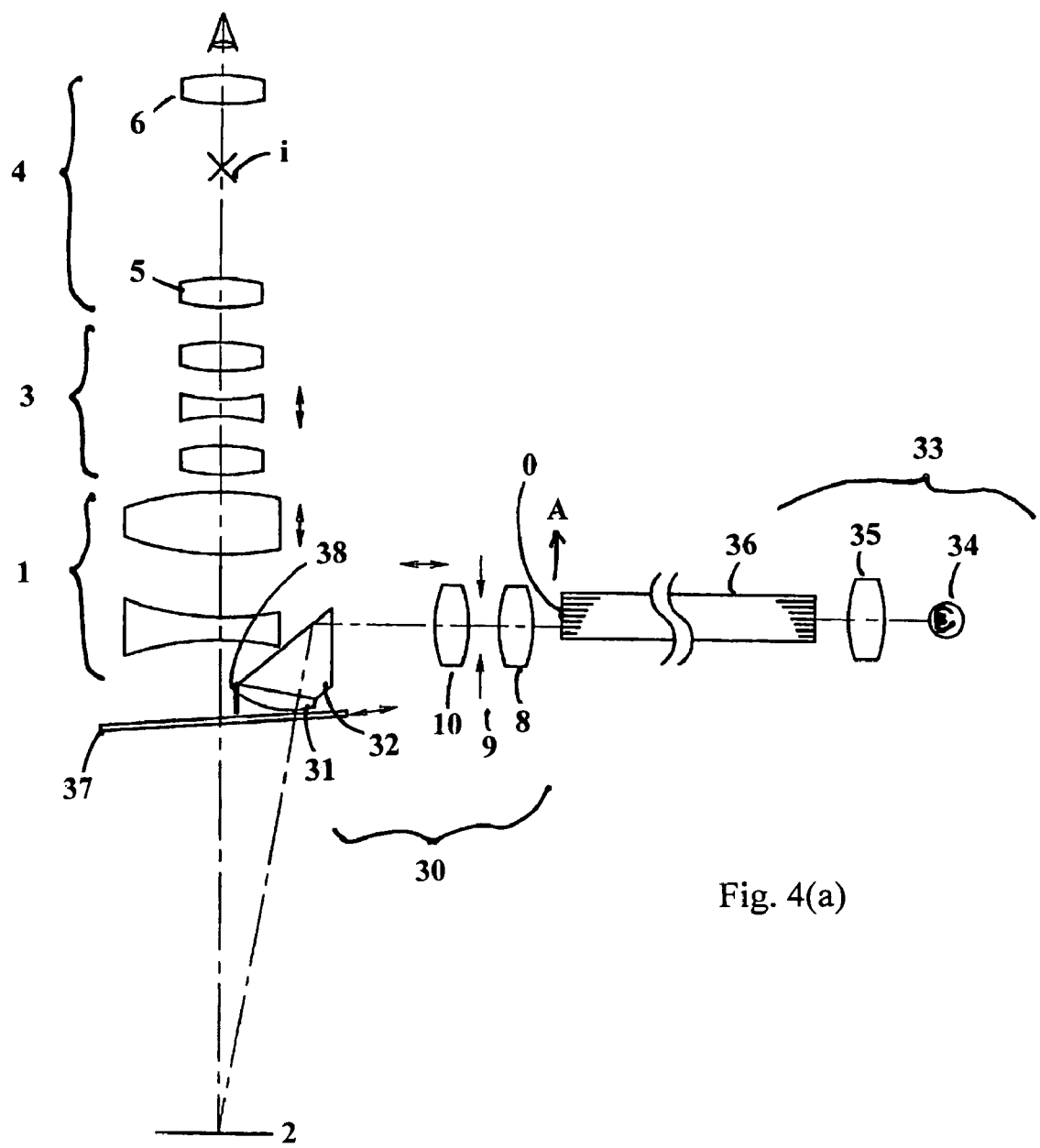
FIGS. 4(a) and 4(b) are a side view and a partial illustration from below, respectively, of a surgical microscope constructed according to Embodiment 3 at the time of high-magnification observation.

The construction of the surgical microscope of the present embodiment is shown in FIGS. 3(a) and 4(a). FIG. 3(a) is a side view of a surgical microscope constructed according to Embodiment 3 at the time of low-magnification observation, and FIG. 4(a) is a side view of a surgical microscope constructed according to Embodiment 3 at the time of high-magnification observation. Labels 33-36 correspond to labels 23-26, respectively, of Embodiment 2 and will not be further described.

Figure 3B:
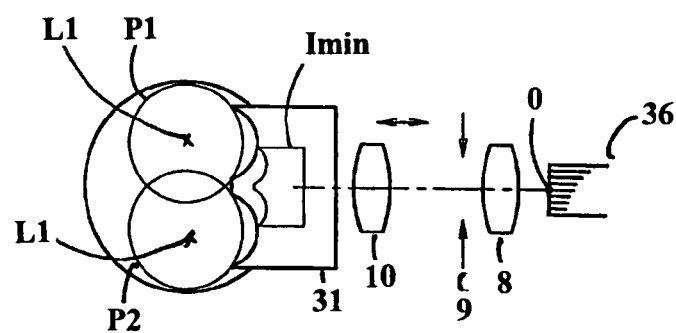
Figure 4B:
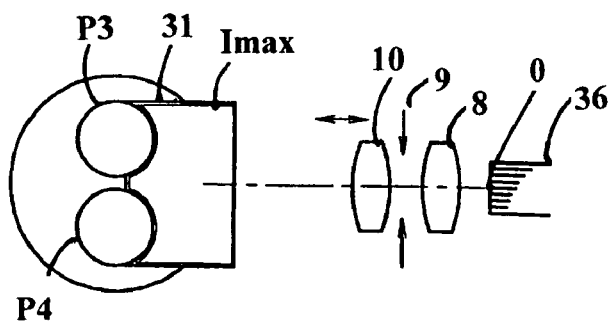

The illumination optical system 30 of the present embodiment is again of the Koehler illumination type (as in Embodiments 1 and 2) and is constructed from a condenser lens 8, an illumination field diaphragm 9, a variator lens 10 which can be moved as indicated by the double-headed arrow to change the illumination range, and an illumination lens 31 that is cemented to a reflecting prism 32. In this embodiment, the illumination lens 31 and attached reflecting prism 32 are equipped with two rounded notches which abut peripheral portions of the light paths of the two observation light fluxes P1 and P2, as shown in FIGS. 3(b) and 9(a)-9(c). Preferably, the rounded notches each encompass 120 degrees of curvature and continually abut peripheral portions of the light fluxes over 120 degrees of curvature at the maximum magnification of the observation optical system, as shown in FIG. 4(b).

Figure 9C:
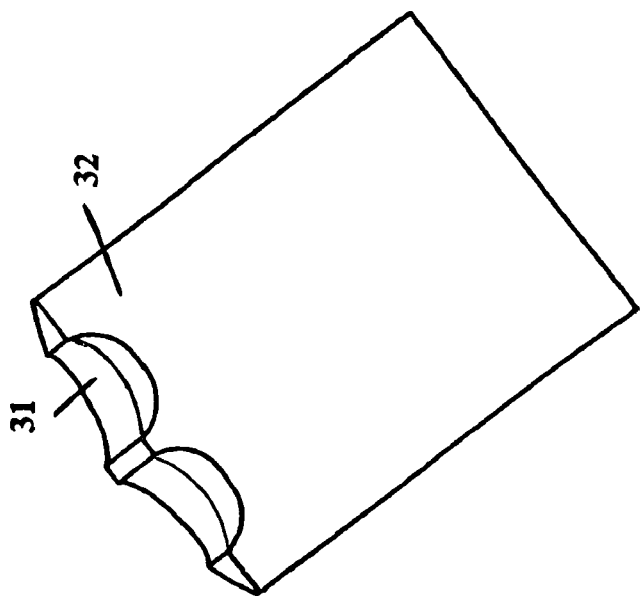
FIGS. 9(a)-9(c) illustrate, as seen from various viewpoints, a reflecting prism used in the illumination system according to Embodiment 3.
Figure 9B:
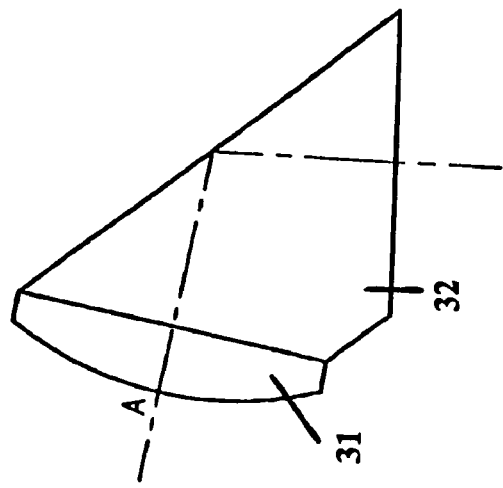
Figure 9A:
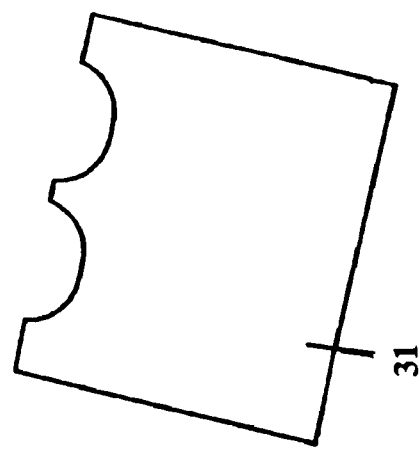

FIG. 9(a) is a view of the illumination lens 31 as seen from the bottom (A in FIG. 9(b)). FIG. 9(b) is a view of the illumination lens and cemented reflecting prism 32 as seen from one side, and FIG. 9(c) is a perspective view of the illumination lens and reflecting prism as seen from the top (right in FIG. 9(b)). The illumination lens 31 and attached reflecting prism 32 are moved relative to the stereoscopic microscope in conjunction with a zooming operation of the observation optical system. When the zooming optical system 3 is positioned for low magnification, the reflecting prism 32 is arranged in a position such that the light fluxes P1 and P2 are not eclipsed by reason of the reflecting prism 32 being adjacent the objective lens 1 in the region where a peripheral portion of the objective lens has been cut-out or omitted, as shown in FIG. 3(a).

As shown in FIG. 4(a), when the zooming optical system 3 is positioned for high magnification, the reflecting prism 32 is also arranged in a position such that the light fluxes P3 and P4 are not eclipsed by the reflecting prism 32. However, in this embodiment the illuminating lens 31 and attached reflecting prism 32 can be positioned closer to the observation optical axis L1 during high magnification than when the zooming optical system is positioned for low magnification. Furthermore, at the time of high magnification, the reflecting prism can be positioned within a space on the object side of the objective optical system so that it is closer to the surgical area 2 than otherwise.

As for the size of the observation light fluxes near the objective lens 1, the observation light fluxes P1 and P2 at the time of low magnification observation are larger than the light fluxes P3 and P4 at the time of high magnification observation. The reason for this is that, for surgical microscopes generally, the pupil position is inside of the zooming optical system 3. Thus, the light fluxes with wider picture angles (i.e., low magnification) are larger near the objective lens 1. Accordingly, the illumination lens 31 with attached reflecting prism 32 can be arranged closer to the observation optical axis at the time of high magnification observation without eclipsing the observation light fluxes. As shown in FIGS. 3(a) and 4(a), a black, light shielding cloth 38 for preventing reflections is attached to the illumination lens 31 to prevent stray light from entering into the observation optical system.

Figure 7:
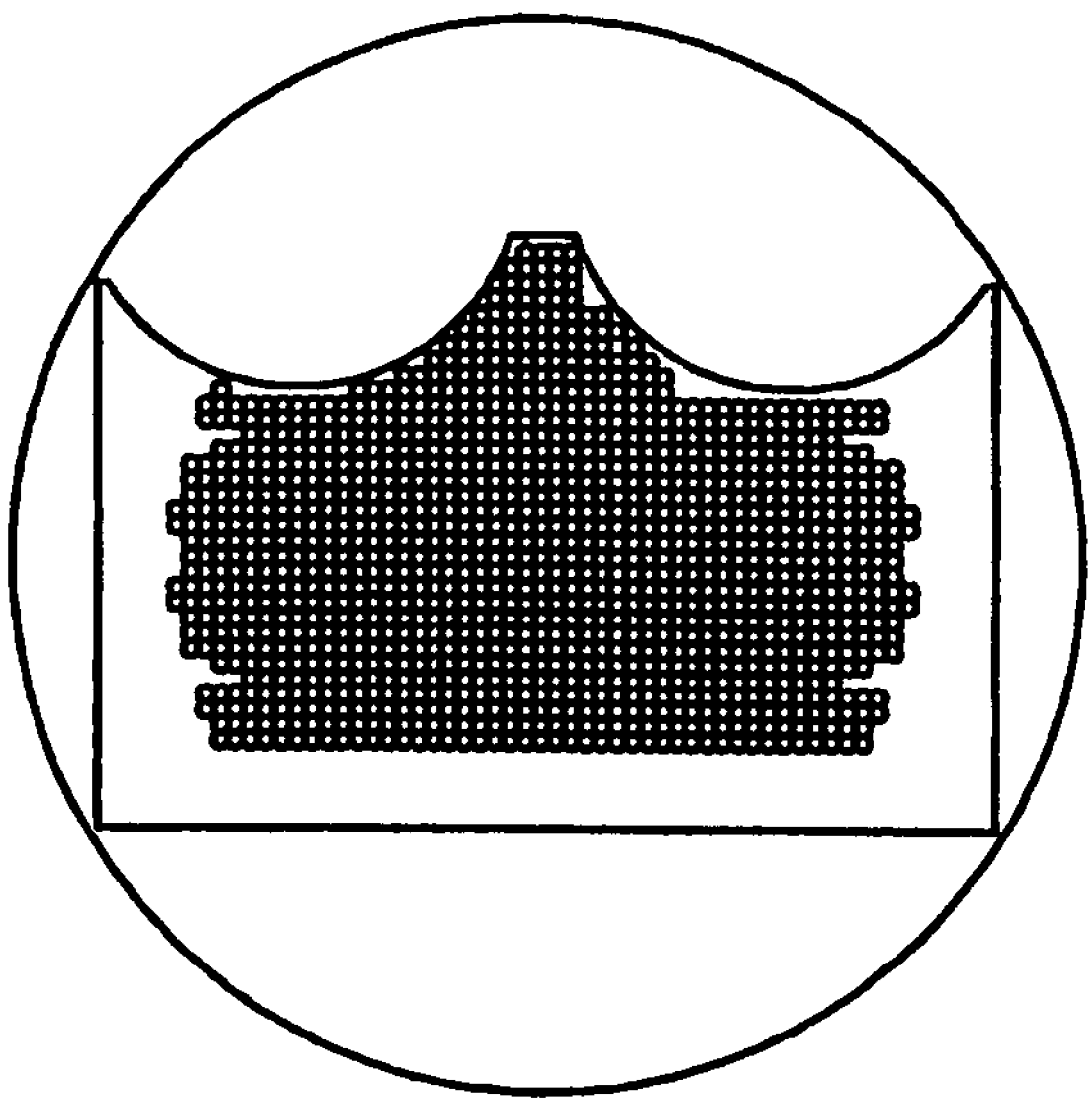
FIG. 7 illustrates the shape of an output end of a light guide according to Embodiment 3.

In this embodiment, the center position O of the output end of the light guide 36 is de-centered with respect to the illumination optical system 30 in the direction indicated by the arrow A in FIG. 3(a) and in FIG. 4(a). Furthermore, it is preferred that the shape of the output end of the light guide 36, as shown in FIG. 7, be similar in shape to the notched transmission surface of the reflecting prism 32.

Figure 8:
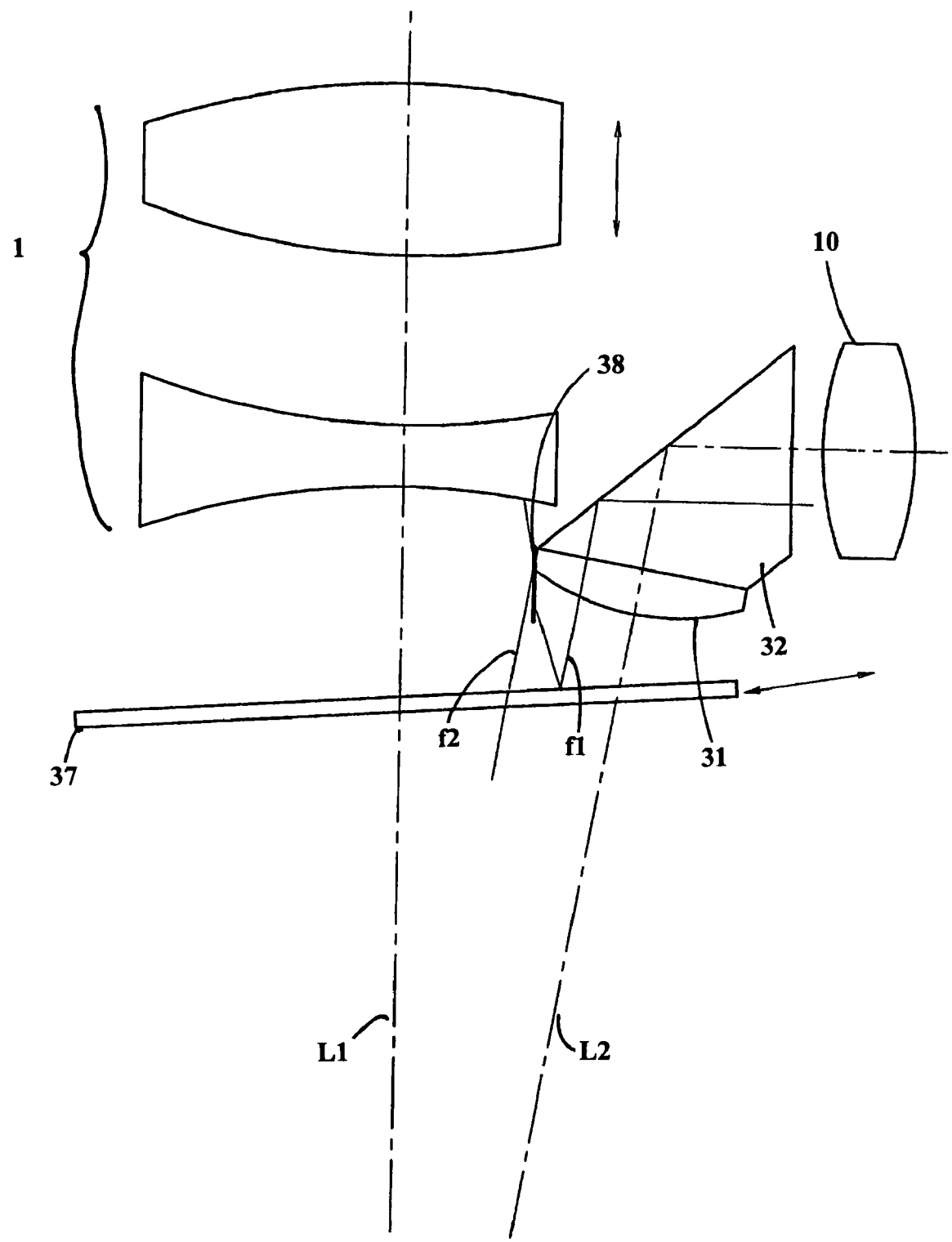
FIG. 8 is an enlarged, side view of an objective optical system and a reflecting prism with attached lens that is used in the illumination system according to Embodiment 3.

As illustrated in FIG. 8, a cover glass 37 is attached to the bottom side of the objective optical system 1 at an angle to the observation optical axis in order to prevent dust from entering and to otherwise prevent the illumination lens 31 or the objective lens of the objective optical system 1 from becoming scratched. The remaining construction is the same as in Embodiment 1, and therefore further description will be omitted.

The light flux output from the light guide 36 forms an image on the reflecting prism 32 and the illumination lens 31 by means of the condenser lens 8 and the variator lens 10. Referring to FIG. 3(b), the output end image of the light guide 36 at the time of low magnification is indicated by Imin. In Embodiment 1, the image Imax (FIG. 1(b)) of the output end of the light guide 16 at the time of high magnification is eclipsed, resulting in some loss of light at high magnification. However, in this embodiment at the time of high magnification, the image Imax (see FIG. 4(b)) of the output end of the light guide 36 is not eclipsed by the objective observation system even though the reflecting prism 32 and the illumination lens 31 at the time of high magnification are moved nearer optical axis of the observation optical system and within a region between the bottom of the objective optical system 1 and the surgical area 2 (see FIG. 4(a)).

Since the two rounded notches are provided in the illumination lens 31 and the reflecting prism 32 that are cemented together, these components (as well as the illuminating light flux) can be placed nearer to the observation optical axis L1 than in Embodiment 1 without causing any eclipsing of the observation light fluxes by being placed within the region between the bottom of the objective optical system 1 and the surgical area 2. Whereas in Embodiment 1, the illumination optical system 7 at the time of high magnification shades the illuminating light flux, thereby causing loss of light, in this embodiment, the surgical area 2 can be illuminated efficiently without loss of light, thereby enabling the surgeon to observe the bottom of a deep hole. As shown in FIG. 3(b), at least the outer edges of the two rounded notches abut peripheral portions of the light fluxes during maximum magnification of the observation optical system.

In addition, since a light shielding cloth is attached to the notched areas of the illumination lens 31 and the reflecting prism 32, the illuminating light flux output from the illumination lens 31 is prevented from flaring into the observation optical path by reflecting directly off of the cover glass 37 (as shown by ray f1 in FIG. 8 and in FIG. 3(a)). Furthermore (as shown by ray f2 in FIG. 8 and in FIG. 3(a)), the light shielding cloth also prevents glare from unwanted reflections from light that is back-reflected at the objective optical system 1 onto the notched surfaces of the illumination lens 31 and reflecting prism 32 from entering into the observation light path.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A stereoscopic microscope, comprising:
a light source section;
an observation optical system that includes an objective lens, left and right zooming optical systems for changing the magnification of the observation optical system, and left and right eyepiece optical systems;
an illumination optical system that includes a reflecting member for leading the light flux from the light source section to an object, the reflecting member being inserted into and removed from a space on the object side of the objective optical system in conjunction with a zooming operation of the left and right zooming optical systems.

2. The stereoscopic microscope according to claim 1, wherein the reflecting member has two rounded notches for abutting peripheral portions of the light paths of the two observation light fluxes so as not to eclipse the light fluxes in these light paths.

3. The stereoscopic microscope according to claim 2, wherein the two rounded notches each encompass 120 degrees or more of curvature and at least the outer edges of the two rounded notches abut peripheral portions of the light fluxes.

4. A stereoscopic microscope, comprising:
a light source section;
an illumination optical system having an optical axis and including a projection optical system that forms a single image within the projection optical system, and which irradiates a light flux from the light source section onto an observation object via the projection optical system;
an observation optical system that includes an objective lens, left and right zooming optical systems for changing the magnification of the observation optical system, and left and right eyepiece optical systems; wherein
a center position of said light source section is de-centered from the optical axis of the illumination optical system;
the illumination optical system includes a variable magnification optical system for changing the range of the illumination field in conjunction with a change in magnification of the observation optical system;
the illumination optical system has a reflecting member for leading the light flux from the light source section to the object and the reflecting member is positioned in the vicinity of an image of the light source section; and
the reflecting member is de-centered from the optical axis of the illumination optical system in a direction that is opposite to the direction that the center of the light source section is de-centered from the illumination optical system.

5. A stereoscopic microscope, comprising:
a light source section;
an illumination optical system having an optical axis and including a projection optical system that forms a single image within the projection optical system, and which irradiates a light flux from the light source section onto an observation object via the projection optical system;
an observation optical system that includes an objective lens, left and right zooming optical systems for changing the magnification of the observation optical system, and left and right eyepiece optical systems; wherein a center position of said light source section is de-centered from the optical axis of the illumination optical system;

an optical member with a non-circular output end is arranged near an image formation surface of the illumination optical system;

the light source section includes a light guide; and the shape of the output end of the light guide is substantially similar to the non-circular shape of the output end of the optical member.

6. The stereoscopic microscope according to claim 2, wherein a reflection prevention member is affixed to the area of the reflecting member having the two rounded notches.

7. The stereoscopic microscope according to claim 6, wherein the reflection prevention member is a light shielding cloth.

8. A stereoscopic microscope, comprising:

a light source section;

an illumination optical system having an optical axis and including a projection optical system that forms a single image within the projection optical system, and which irradiates a light flux from the light source section onto an observation object via the projection optical system;

an observation optical system that includes an objective lens, left and right zooming optical systems for changing the magnification of the observation optical system, and left and right eyepiece optical systems;

wherein a center position of said light source section is de-centered from the optical axis of the illumination optical system; and the illumination optical system has a reflecting member that leads the light flux from the light source section to an object, the reflecting member being inserted into and removed from a space on the object side of the objective lens in conjunction with a zooming operation of the observation optical system.

9. The stereoscopic microscope according to claim 8, wherein the reflecting member has two rounded notches for abutting peripheral portions of the light paths of the two observation light fluxes so as not to eclipse the light fluxes in these light paths.

10. The stereoscopic microscope according to claim 9, wherein the two rounded notches each encompass 120 degrees or more of curvature.

11. The stereoscopic microscope according to claim 8, wherein the reflecting member is moved toward the object and toward the optical axis of the observation optical system when the observation magnification is changed from low magnification to high magnification.

12. The stereoscopic microscope according to claim 10, wherein the observation magnification is within a range of 7 to 25.

13. A stereoscopic microscope according to claim 1, wherein the reflecting member is moved toward the object and toward the optical axis of the observation optical system when the observation magnification is changed from low magnification to high magnification.

14. The stereoscopic microscope according to claim 3, wherein the observation magnification is within a range of 7 to 25.

15. The stereoscopic microscope according to claim 2, wherein the two rounded notches each encompass 120 degrees of curvature and continually abut peripheral portions of the light fluxes over 120 degrees of curvature at the maximum magnification of the observation optical system.

16. A stereoscopic microscope, comprising:

a light source section;

an illumination optical system having an optical axis and including a projection optical system that forms a single image within the illumination optical system and which irradiates a light flux from the light source section onto an observation object;

an observation optical system that includes an objective lens, left and right zooming optical systems for changing the magnification of the observation optical system, and left and right eyepiece optical systems;

wherein a center position of said light source section is de-centered from the optical axis of the illumination optical system such that a distance between the illumination light flux and the optical axis of the observation optical system is smaller when the light source section is de-centered from the optical axis of the illumination optical system than when the light source section is aligned on the optical axis of the illumination optical system.

17. The stereoscopic microscope according to claim 16, wherein:

the illumination optical system includes a reflecting member for leading the light flux from the light source section to the object; and the reflecting member is positioned in the vicinity of an image of the light source section.

18. The stereoscopic microscope according to claim 16, wherein the illumination optical system includes a variable magnification optical system for changing the range of the illumination field in conjunction with a change in magnification of the observation optical system.

19. The stereoscopic microscope according to claim 16, wherein the de-centering amount of the center of the light source section relative to the illumination optical system is changeable.

* * * * *